US010759553B2

(12) United States Patent
Henry et al.

(10) Patent No.: US 10,759,553 B2
(45) Date of Patent: Sep. 1, 2020

(54) DEVICE AND METHOD FOR SAMPLING A LIQUID

(71) Applicants: Grégoire Henry, Caluire et Cuire (FR); Tristan Destremau, Tassin la Demi Lune (FR)

(72) Inventors: Grégoire Henry, Caluire et Cuire (FR); Tristan Destremau, Tassin la Demi Lune (FR)

( * ) Notice: Subject to any disclaimer, the term of this patent is extended or adjusted under 35 U.S.C. 154(b) by 169 days.

(21) Appl. No.: 15/778,288

(22) PCT Filed: Nov. 24, 2016

(86) PCT No.: PCT/FR2016/053085
§ 371 (c)(1),
(2) Date: May 23, 2018

(87) PCT Pub. No.: WO2017/089717
PCT Pub. Date: Jun. 1, 2017

(65) Prior Publication Data
US 2018/0346165 A1    Dec. 6, 2018

(30) Foreign Application Priority Data
Nov. 24, 2015    (FR) .................................... 15 61291

(51) Int. Cl.
*B65B 25/00*    (2006.01)
*B67C 9/00*    (2006.01)
(Continued)

(52) U.S. Cl.
CPC .............. *B65B 25/001* (2013.01); *B65B 3/06* (2013.01); *B65B 3/12* (2013.01); *B65B 3/26* (2013.01);
(Continued)

(58) Field of Classification Search
CPC .... B67B 7/00; B67B 7/04; B67B 7/28; B65B 7/28; B65B 31/041; B65B 37/02;
(Continued)

(56) References Cited

U.S. PATENT DOCUMENTS

| | | | |
|---|---|---|---|
| 6,457,299 B1 * | 10/2002 | Schwenke | ............. B65B 31/025 53/110 |
| 2003/0019364 A1 * | 1/2003 | Carvin | ............... A47G 19/2205 99/275 |

(Continued)

FOREIGN PATENT DOCUMENTS

| | | | | |
|---|---|---|---|---|
| AU | 3906672 A | * | 8/1973 | ........... B65B 55/027 |
| AU | 3906672 A | | 8/1973 | |

(Continued)

OTHER PUBLICATIONS

PCT International Search Report and Written Opinion dated Feb. 6, 2017 from corresponding Application No. PCT/FR2016/053085.

*Primary Examiner* — Hemant Desai
*Assistant Examiner* — Jacob A Smith
(74) *Attorney, Agent, or Firm* — Diworth IP, LLC

(57) ABSTRACT

The present invention relates to a device and a method for decanting a beverage initially contained in one or more closed bottles into smaller containers. The device comprises an enclosure under an inert atmosphere, provided with an inlet port comprising receiving means, into which inlet port the neck of the bottles is fitted, and an outlet port through which the hermetically sealed containers are evacuated. The device contains an opening station for opening the bottles fitted into the receiving means, a collection vessel that collects the liquid flowing out of the bottles, a filling station for filling the containers from the collection vessel, and a sealing station for hermetically sealing the containers. In the method, the steps of opening and emptying the bottles, and (Continued)

of filling and hermetically sealing the containers, are all carried out under an inert atmosphere.

10 Claims, 2 Drawing Sheets

(51) Int. Cl.

| | | |
|---|---|---|
| B67D 1/08 | (2006.01) | |
| B65B 31/02 | (2006.01) | |
| B65B 31/04 | (2006.01) | |
| B65B 57/14 | (2006.01) | |
| B65B 3/06 | (2006.01) | |
| B65B 3/12 | (2006.01) | |
| B65B 7/28 | (2006.01) | |
| G01F 23/00 | (2006.01) | |
| B67B 7/04 | (2006.01) | |
| B65B 43/44 | (2006.01) | |
| B67D 3/00 | (2006.01) | |
| B65B 43/52 | (2006.01) | |
| B65B 3/26 | (2006.01) | |
| B65B 69/00 | (2006.01) | |
| B65B 37/06 | (2006.01) | |
| B65B 37/02 | (2006.01) | |
| B67B 7/00 | (2006.01) | |
| B65B 39/00 | (2006.01) | |
| B67C 3/26 | (2006.01) | |
| B65B 3/30 | (2006.01) | |

(52) U.S. Cl.
CPC .............. *B65B 7/28* (2013.01); *B65B 31/025* (2013.01); *B65B 31/041* (2013.01); *B65B 37/02* (2013.01); *B65B 37/06* (2013.01); *B65B 43/44* (2013.01); *B65B 43/52* (2013.01); *B65B 57/145* (2013.01); *B65B 69/00* (2013.01); *B67B 7/00* (2013.01); *B67B 7/0405* (2013.01); *B67C 9/00* (2013.01); *B67D 1/0885* (2013.01); *B67D 3/0032* (2013.01); *B67D 3/0038* (2013.01); *B67D 3/0054* (2013.01); *G01F 23/00* (2013.01); *B65B 3/30* (2013.01); *B65B 2039/009* (2013.01); *B65B 2210/06* (2013.01); *B65B 2210/08* (2013.01); *B67C 2003/2694* (2013.01)

(58) Field of Classification Search
CPC ......... B65B 43/44; B65B 53/52; B65B 69/00; B65B 2039/009; B67C 9/00; B67C 2003/2694; B67D 3/0038; B67D 1/0885
USPC .......................................................... 53/471
See application file for complete search history.

(56) References Cited

U.S. PATENT DOCUMENTS

| | | | | |
|---|---|---|---|---|
| 2006/0226176 A1* | 10/2006 | Tseng | .................... | B67D 3/0038 222/401 |
| 2006/0231157 A1* | 10/2006 | Marcus | ................. | B65B 31/041 141/85 |
| 2007/0193652 A1* | 8/2007 | Till | .......... | F16J 15/40 141/144 |
| 2008/0011660 A1* | 1/2008 | Walton | ................. | B67D 3/0032 210/209 |
| 2008/0017045 A1* | 1/2008 | McGuire | .............. | B67D 1/0406 99/323 |
| 2008/0184668 A1* | 8/2008 | Monti | ..................... | B65B 57/04 53/53 |
| 2009/0098250 A1* | 4/2009 | Py | .............................. | A23L 2/46 426/62 |
| 2010/0252142 A1* | 10/2010 | Adriansens | ............. | B65B 55/10 141/98 |
| 2010/0276453 A1* | 11/2010 | Vandaele | ............ | B01F 15/0203 222/152 |
| 2015/0122369 A1* | 5/2015 | Py | ........................ | A61M 39/26 141/1 |

FOREIGN PATENT DOCUMENTS

| | | | | |
|---|---|---|---|---|
| EP | 0403171 A1 * | 12/1990 | ............. | G07F 13/02 |
| EP | 0403171 A1 | 12/1990 | | |
| FR | 2650816 A1 | 2/1991 | | |
| FR | 2987041 * | 2/2012 | ............... | B67C 9/00 |
| FR | 2987041 A1 * | 8/2013 | ............... | B67C 9/00 |
| FR | 2987041 A1 | 8/2013 | | |
| WO | 01/42087 A2 | 6/2001 | | |
| WO | WO-2006050370 A2 * | 5/2006 | ......... | B65D 81/2076 |
| WO | 2015/136166 A1 | 9/2015 | | |
| WO | WO-2015136166 A1 * | 9/2015 | ............. | B65B 7/145 |

* cited by examiner

DEVICE AND METHOD FOR SAMPLING A LIQUID

This application is the U.S. national phase of International Application PCT/FR2016/053085, filed Nov. 24, 2016, claiming priority to French Patent Application 1561291 filed Nov. 24, 2015; the disclosures of International Application PCT/FR2016/053085 and French Patent Application 1561291, each as filed, are incorporated herein by reference.

FIELD OF THE INVENTION

The present invention relates to an automated method for sampling a liquid that can be sensitive to contact with air, for example an alcoholic beverage, notably wine, by means of the decanting under an inert atmosphere of a first container, containing the liquid to be sampled, into final, hermetically sealed containers of a smaller volume.

BACKGROUND OF THE INVENTION

Alcoholic beverages, especially wine, are generally packaged in bottles with a standard capacity (75 cL) for the commercialization thereof. Such bottles contain a relatively large amount of beverage corresponding to the capacity of several glasses. The selling price of an individual bottle can be relatively high, in particular for quality wines that have been aged in the bottle for a certain number of years.

However, it is known that wine, like other liquids or alcoholic beverages, is sensitive to contact with air, especially the oxygen content in air. Once the bottle is uncorked and the wine placed in contact with the oxygen in the air, the wine oxidizes quite quickly and the organoleptic qualities thereof deteriorate. It is therefore important to consume the contents of a bottle rapidly after the opening thereof.

Due to the cost of bottles and the short shelf life thereof once opened, producers, wine boutiques and other wine sellers are reluctant to open the bottles in order to allow potential buyers to taste the wines. Buyers must therefore choose the bottles they wish to acquire without having previously tasted the contents or must have the opportunity to participate in infrequent commercial tasting events. Buyers may well hesitate before investing sometimes large sums for the purchase of bottles, on the basis of the information given on the label, recommendations from a seller or the rating of a critic.

The availability to sellers, and the potential buyers thereof, of samples of these bottles of wine would be a real advantage. It would make it possible for potential buyers to taste small amounts of wine or other alcoholic beverages, on site or at home, for the consumer or professional, without having to open a bottle thereof. Said sample, of a lower cost, could then be graciously offered by the seller or sold at a low price. The cost of mailing samples is also much lower than that for a 75 cl bottle.

The buyer could thus form a personal opinion concerning the quality of a wine before proceeding with the purchase of one or more bottles thereof. The buyer could also taste several vintages of the same wine and compare the maturation state thereof depending upon the year, in order to choose the one preferred. Such tastings, prior to the act of purchase, are very important in an area such as the sale of wine or other alcoholic beverages, an area wherein the assessment of quality is very subjective and depends upon personal taste.

It would also allow the seller to distribute free samples after a first purchase or during promotions or various events, also by mail, in order to generate further future purchases. The seller could thus validate the client's provisional choice, illustrate the description made thereof by tasting, introduce unknown or unjustly underrated wines, improve the sale of a wine the seller wants to promote or destock, or for example prove the proper conservation of a wine that one would tend to believe to be too old.

Other applications, such as for example using the ratings of wine critics, the training of oenologists, sommeliers and others involved in the selling or tasting of wine or simply amateurs, can also be cited.

Finally, such samples could also satisfy people who want to consume a small amount of wine, a glass, for example, and who are often reluctant to open a bottle for that reason only, knowing that the remaining content is likely to spoil. The availability of samples for these people, the content of which preferably corresponds to a glass of wine, thus makes it possible, for example, to occasionally please a solitary consumer or other guests wishing to choose different wines according to their personal tastes.

For all these reasons, it would be very advantageous and particularly desirable to have a device and an automated sampling method that make it possible to decant the contents of one or several bottles of wine or other alcoholic beverage into several smaller hermetically sealed containers.

However, in order to retain this advantageous character, it is highly preferable that the decanted wine or other alcoholic beverage does not suffer any degradation of the organoleptic properties thereof during sampling. Indeed, as already explained above, alcoholic beverages, including wine, are particularly sensitive to the presence of oxygen.

Even though some wine sampling devices are known in the prior art, none of them make it possible to fully perform the process of decanting and sampling without there being contact between the wine and the oxygen in the ambient air. Generally, in the prior art, the wine bottle to be sampled is first uncorked outdoors before being fitted within a device and receiving a sealing stopper through which the wine is drawn. Similarly, in the prior art, contact between the air and wine is possible during the step of closing the sampling tubes, which does not take place within a confined space under an inert atmosphere. This placing the wine in contact with the oxygen in ambient air during the sampling process may be the cause of damage to the wine, or at least an evolution of the wine contained within the tube that differs from that contained within the combined bottles of the one emptied in order to perform the sampling.

For example, document FR 2,987,041 discloses a wine repackaging device and method. The aim of this document is to repackage wine bottles that may be damaged, especially when the corks are likely to lose the original properties thereof. The aim is therefore to decant the wine into new containers wherein the capacity is identical to that of the initial bottles. This is not wine sampling. The bottles are not open, they are integrally placed within the device by virtue of a hatch and then broken before the wine is recovered and filtered. Thus, the wine is in contact with the broken bottle fragments. The filling of new bottles is performed externally to the device, thus making it possible to optimize the dimensions thereof.

Documents WO 2015/136,166 and WO 01/42087 disclose devices for sampling wine within glasses. These glasses can then be closed by means of lids, externally to the devices. Again, the wine is in contact with oxygen, at least between the filling of a glass and the placing of a lid thereupon.

In order to ensure the conservation of the sampled wine despite this contact with oxygen during the decanting process, it is recommended in the prior art to add sulfites to the wine contained within the bottle after having uncorked it and before transferring it to the sampling device. While this allows for better conservation of the wine within the samples, the addition of sulfur is particularly disadvantageous insofar as it is inconvenient for a number of consumers, it is incompatible with some types of wines (particularly wines made without added sulfites, known as wine without sulfur) and may denature the organoleptic properties of the wine contained within the sample, which is found to be modified with respect to the original wine contained within the bottle.

SUMMARY OF THE INVENTION

In contrast, the invention provides a device for implementing a sampling method which comprises a sealed enclosure wherein there prevails an inert atmosphere and wherein the set of sampling operations is performed. The invention also provides a sampling method wherein all of the steps are entirely performed under an inert atmosphere, from the initial uncorking of the bottles to the sealing step for the final containers. This method implements said device. The device according to the invention therefore comprises a vessel which is under an inert atmosphere during all of the uncorking and emptying operations of the initial containers, together with the filling and sealing of the final containers. Unlike devices of the prior art, the device of the invention makes it possible to perform all of the sampling steps within a single enclosure, without contact with the external environment.

To solve this technical problem, the invention teaches of a device and method for sampling a liquid capable of being sensitive to contact with air, that make it possible to decant (English translation of the French word "transvaser") a liquid, previously contained within a sealed, initial container into several final containers of a smaller capacity than that of the initial container.

According to the invention, this device comprises:
an enclosure wherein there prevails an inert atmosphere,
an inlet port of at least one initial container, providing an interface between the exterior which is exposed to ambient air and the inlet to the enclosure, and comprising at least one receiving means which communicates with the interior of the enclosure,
an inlet port of the final containers, providing an interface between the exterior which is exposed to ambient air and the inlet to the enclosure, and comprising at least one means of introduction, wherein the final containers can be fully fitted from the exterior,
an outlet port, providing an interface between the outlet of the enclosure and the exterior which is exposed to ambient air. Through said outlet port, the hermetically sealed final containers are evacuated to the exterior of the enclosure.

Where appropriate, the device may comprise an inlet port for introducing closure means for the final containers. These closure means may also be introduced with the final containers. This is particularly the case when the final container integrates the closing means thereof, for example, closure means of the swing top or cork type.

According to the invention, the enclosure comprises the following means, which are advantageously placed under an inert atmosphere:

an opening station comprising means for opening at least one initial container fitted into the at least one receiving means of the inlet port,
a collection vessel, located beneath the opening station or communicating therewith in order to collect the liquid contained within the at least one initial container,
a filling station for filling the final containers with the liquid collected within the collection vessel,
a sealing station for hermetically sealing the containers.

The inlet port means for receiving is configured in such a way that the at least one initial container is at least partially fitted from the exterior until the part intended to be opened of said initial container emerges into the enclosure.

According to one embodiment of the invention, the enclosure comprises a regulation and processing unit making it possible to:
regulate the proportion of inert gas contained within the volume, and/or
maintain the quality thereof (oxygen scavenger, etc.), and/or
control the particle concentration, and/or
control parameters such as the temperature, the humidity and the relative pressure.

Said regulation and processing unit also manages the flow of ambient air, in blowing or aspirating, in order to flush those parts of the device to be either filled with inert gas for the process, or opened to free air for operating and maintenance.

According to one embodiment of the invention, the inlet port comprises a plurality of receiving means and the opening station comprises a plurality of opening means provided in order to open several initial containers.

The opening means is actuated externally to the device, as are all of the filling and sealing means of the final containers.

According to a further embodiment, the filling station comprises means that make it possible to simultaneously fill several final containers.

Finally, the invention teaches of the use of the sampling device according to the invention for sampling wine or another liquid foodstuff or alcoholic beverage.

Advantageously, the invention also teaches a sampling method comprising the following steps:
supplying at least one sealed, initial container containing a liquid,
supplying several empty final containers of a capacity that is less than that of the at least one initial container, and the following steps, all performed under an inert atmosphere:
opening the at least one initial container,
emptying this at least one initial container and collecting said liquid that is contained within a collection vessel,
filling the final containers with a portion of said liquid provided by the collection vessel, and
hermetically sealing the final containers filled with said liquid.

This process is advantageously performed by means of a sampling device according to the invention.

According to one embodiment, prior to the implementation of the method, the sampling device is placed under an inert atmosphere, a plurality of final containers being within said sampling device. Thus, it is preferable to introduce the necessary number of final containers within the device before implementing the method.

According to a further embodiment, the final containers are introduced as the method progress, by means of a port. They are empty and open when introduced. The port makes it possible to purge the ambient air, notably the oxygen.

According to a further embodiment, the final containers are made within the machine, as the method progresses, from raw materials introduced before or during the implementation of the method.

According to a further preferential embodiment of the invention, the at least one supplied initial container contains wine, or another liquid food or alcoholic beverage. The initial container generally comprises between 0.375 and 15 liters of liquid, preferably between 0.75 and 4.5 liters, more preferably between 0.75 and 1.5 liters. Even more advantageously, the initial container comprises 0.75 liters of liquid.

According to a variant of the invention, several initial containers are simultaneously provided.

According to a further variant, final containers are provided with a capacity of less than 5 cL and preferentially comprising between 1 and 3 cL.

According to a further variant of the invention, final containers are provided with a capacity that is essentially equivalent to a glass of a beverage, i.e., between 7 and 20 cL.

According to one embodiment of the invention, an enclosure is provided wherein an inert atmosphere is generated from one or more low-reactive gas, preferably nitrogen, argon or carbon dioxide, and within which all of the steps of the method performed under an inert atmosphere are fully carried out. The inert atmosphere typically comprises less than 5000 ppm oxygen, more preferably less than 1000 ppm oxygen, still more preferably less than 100 ppm. In practice, the atmosphere comprises less than 50 ppm oxygen and most preferably less than 10 ppm oxygen. A person skilled in the art will know how to adapt the purging conditions based upon the oxygen amount threshold, which should not be exceeded; this may depend upon the nature of the liquid to be sampled.

Thus, the atmosphere for the final containers can be controlled, for example in supplying a mixture of inert gases.

According to a further embodiment, the at least one initial container is only partially fitted into said enclosure. Preferably, only the part of the initial container that is intended to be opened in order to empty the container is fitted into said enclosure. This is for example the neck of a bottle, the neck or the mouth of a bag-in-box or a cubitainer, or the tap of a tank, a drum or a cask. In this case, the partially fitted initial container contributes to the sealing of the device at the port.

According to one embodiment of the invention, the final containers are filled consecutively.

According to a further variant, several final containers are simultaneously filled.

According to one embodiment, the filled final containers are hermetically sealed, directly by means of welding or gluing, or by means of an independent insert such as, for example, a lid, a capsule or stopper.

DETAILED DESCRIPTION OF THE INVENTION

Figure 1:
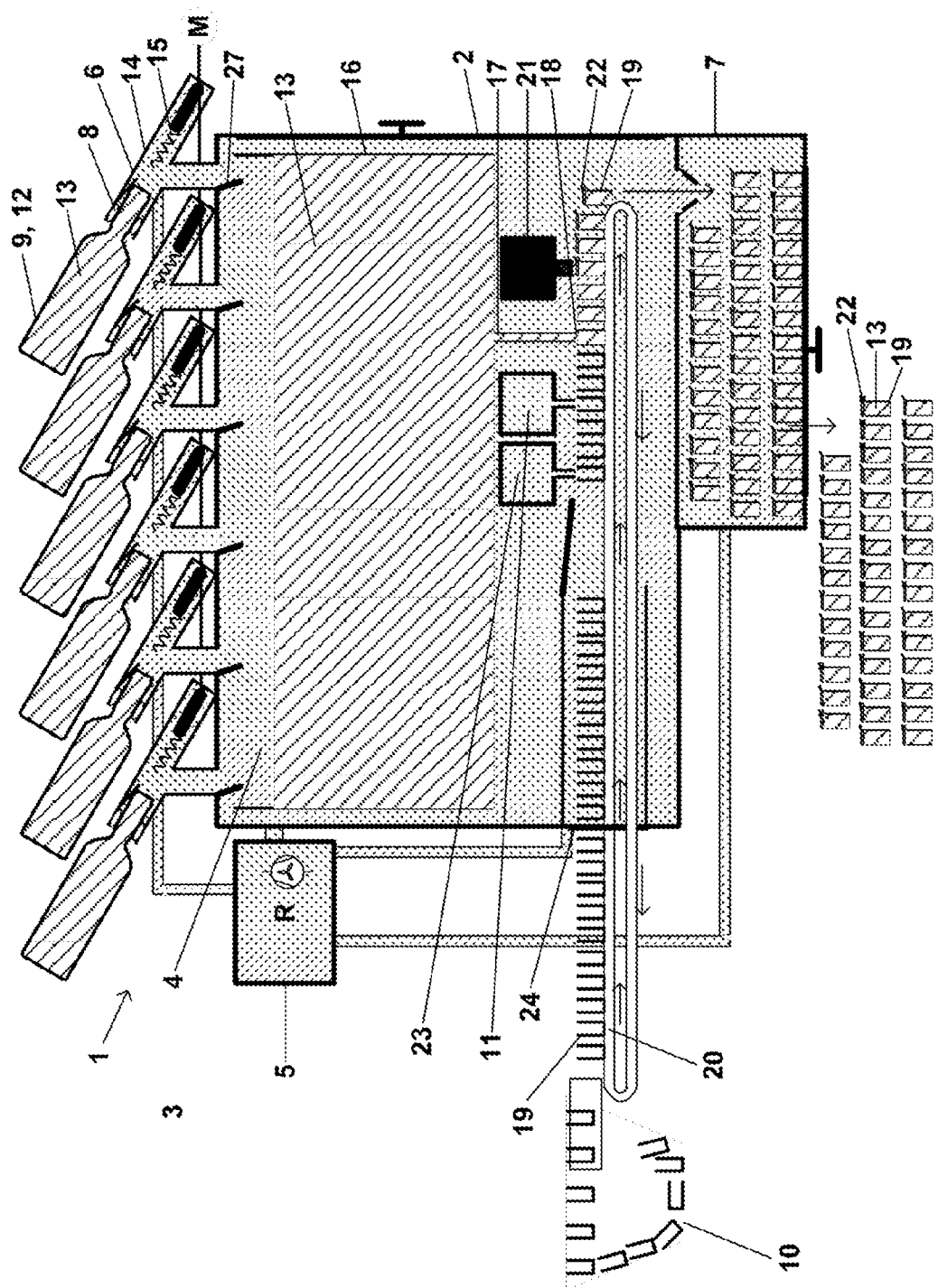
FIG. 1 is a schematic overview of a sampling device allowing the decantation of several bottles, and the simultaneous filling of several final containers.

The method and device according to the invention make it possible to implement the sampling entirely under an inert atmosphere and without any contact between the liquid, preferably wine, and the oxygen in the air. One of the advantages may be in not having to add sulfites to the wine as in the prior art, this operation being aimed at trapping the oxygen being introduced into the wine. Thus, the invention makes it possible to have better preservation of the organoleptic qualities of the liquid sample, especially wine.

The sampling method according to the invention does not make changes to the wine. The repackaged wine within the samples (final containers) is in the same state as that contained within the initial bottles. No substantial change, nor evolution nor alteration to the original wine is to be expected by virtue of the absence of contact with the ambient air during all of the steps of the method. In fact, during all of these steps, the device of the invention makes it possible to manage the amount of oxygen present, but also the temperature and the sampling pressure or the removal of any particles for example by means of filtration.

The repackaged wine within the final containers thus remains very similar to that contained within the combined bottles of the same vintage and retains the organoleptic qualities of the parent bottle. Any empty space within the final containers is filled with inert gas.

Furthermore, the fact that, according to a preferred variant of the invention, the initial bottles are not entirely introduced into the enclosure under an inert atmosphere, provides additional benefits. Indeed, thanks to the inlet port and the receiving means thereof, the initial bottles can be introduced to and evacuated from the device much more easily than if they were placed entirely within the enclosure under an inert atmosphere, and this without generating significant disruption to said inert atmosphere.

Insofar as only a part of the initial container, intended to be opened, is fitted into the port of the enclosure under an inert atmosphere, the volume of the latter can be much more confined than if it had to contain all of the initial containers. The enclosure and the inert atmosphere generation system thereof are thereby less costly, smaller and simpler to implement, even though, unlike the prior art devices, they can simultaneously process several initial containers.

In order to subsequently recover, within a collection vessel, the wine from the bottle(s) introduced into the port under an inert atmosphere prior to filling the final containers, different means may be used, preferably by means of:
- uncorking the bottle and spilling the liquid by gravity, or by means of
- uncorking the bottle and inserting a liquid suction pipe to the bottom of the bottle, or by mean of
- passing a needle through the cork (if corked) to the bottom of the bottle and aspirating the liquid.

To this end, every means known in the state of the art can be used (including conventional corkscrew, bi-metal, inserting a needle through the stopper followed by extraction by means of pressure, pushing the cork inside, in the case of a screw cap unscrewing it, perforation, etc.). One of the advantages of the invention lies in performing this operation under an inert atmosphere, which makes it possible for the liquid not to come into contact with air, even during opening. In general, the opening of the initial container is performed without breaking it. Thus, once the initial container is open, the contents thereof are poured out and no longer come into contact with the material constituting the original container. This avoids contamination of the liquid to be sampled, which is difficult to achieve when the original container is broken.

The actuators allowing for the movement of the uncorking members are either integrated into the port, or externalized.

In a preferred embodiment, the sampling process is stationary, due to the industrial characteristic thereof, thus allowing for high throughput, advantageously between 10 and 200 samples per minute, and in a preferred embodiment between 20 and 40.

According to one embodiment of the invention, the machine has a cleaning cycle mode that uses a suitable solution. Said cleaning can be limited to the inlet port, the outlet port, the heart of the enclosure, or else it can be complete. Said cycle allows for the preparation of the machine for the sampling cycle for the following bottles.

The cleaning can be brief (air blowing, water injection) or up to the complete sterilization of the members of the device according to the invention.

In one of its variants, the invention is associated with a set of tests in order to certify the preservation of the wine during the process.

Figure 2:
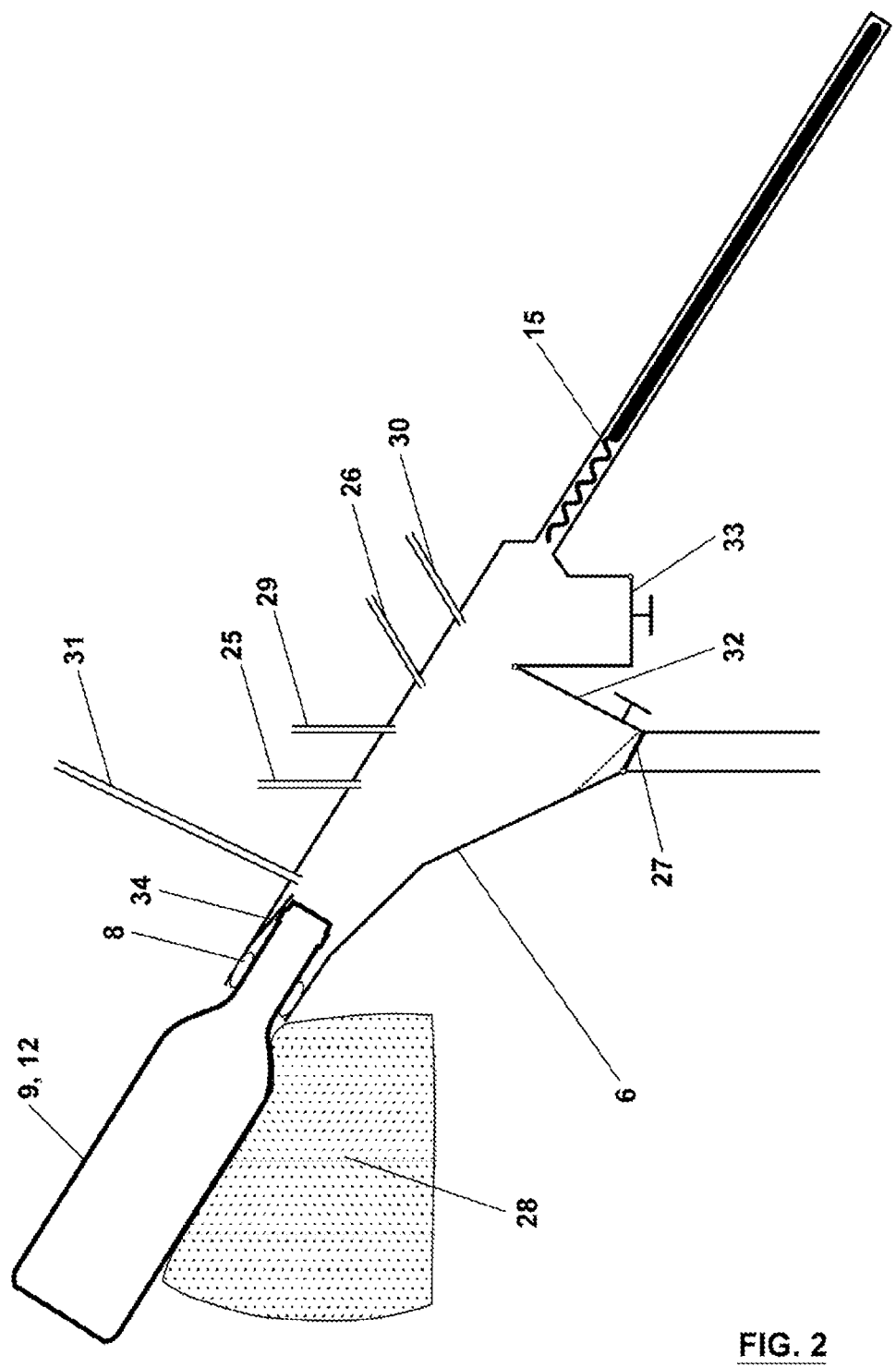
FIG. 2 illustrates the inlet port of an initial container and an opening station of the sampling device allowing the decantation of a single bottle and the filling of a final container, one at a time.

Other features and advantages of the invention will appear upon reading the detailed description which follows, which is made with reference to the accompanying drawings, wherein:

FIG. 1 is a schematic overview of a particular embodiment of the sampling device according to the invention allowing for the decanting of several bottles and the simultaneous filling of several final containers;

FIG. 2 illustrates a particular embodiment of the inlet port of an initial container and an opening station of the sampling device according to the invention allowing for the decanting of a single bottle and the filling of a final container, one at a time.

The method and the sampling device according to the present invention will now be described in detail with reference to FIGS. 1 and 2. Equivalent items shown in different figures will bear the same reference numbers. The following characteristics apply to all embodiments of the invention, and are by no means limited to those illustrated in FIGS. 1 and 2. They thus apply to all devices of the invention, for example devices having one or more inlet ports 6, the devices having any type of opening means 15 (including conventional corkscrew, bi-metal, inserting a needle through the stopper followed by extraction by means of pressure, pushing the cork inside, in the case of a screw cap unscrewing it, perforation, etc.).

The sampling device 1 comprises a sealed enclosure 2, isolated from the external environment 3 exposed to ambient air, and wherein there prevails an inert atmosphere 4.

Said atmosphere 4 is preferentially implemented using a gas or a mixture of low-reactive gases, for example nitrogen, argon or carbon dioxide, which are injected into the enclosure 2, thereby replacing the air. The device 1 can then comprise a gas reserve, not shown, and regulation means 5 that are suitable for controlling the amount, temperature and pressure of the inert gases within the enclosure 2.

The enclosure 2 is advantageously supplied with an inlet port 6 for the initial containers, an inlet port 24 for the empty final containers and an outlet port 7 for the filled final containers. Said ports form the interface between the external environment 3 and the inside of the enclosure 2 under an inert atmosphere 4. They enable the continuous operation of the sampling device 1 according to the invention, without having to open the enclosure 2 and disrupt the inert atmosphere 4 therein.

The inlet port of the initial containers 6 is preferably positioned on top of the device.

It advantageously comprises two doors (34 and 27, FIG. 2), the first providing the inlet of the port (interface with the exterior) and the second providing the outlet of the port (interface with the inert enclosure 2). The filling of the inlet port of the initial container 6 with inert gas is performed once the end of the initial container 9 is introduced, and a seal is formed around said end (by means of a pneumatic seal or otherwise), in order to subsequently allow for communication with the inert enclosure 2. The size of said port is advantageously reduced as much as possible in order to decrease the losses of quantities of inert gases during the purging of the port.

The corks, pieces of corks and natural deposits contained within wine can advantageously be evacuated at the inlet port of the initial containers 6 without having to open the enclosure 2 and disrupt the inert atmosphere 4 therein.

For this purpose, the following means are taught in the invention:
- device making it possible to separate the cork from the extraction means of the bottle and to store it within the inlet port of the initial containers 6,
- liquid filtering matrix in order to retain the natural deposits and pieces of cork,
- system for cleaning the port by means of a liquid suitable for rendering the device directly and quickly usable for the sampling of the following bottle(s).

According to the variants, the inlet port 6 comprises one (FIG. 1) or several (FIG. 2) receiving means 8 into which the initial containers 9 can be partially fitted.

Preferably, said receiving means 8 has a first receiving part, open and directed outwards, of a flared shape matching that of the initial container 9, which extends by means of a narrower through-duct, emerging into the interior of the enclosure 2.

As already indicated, the receiving means 8 makes it possible to implement a seal between the enclosure 2 and the external environment 3, advantageously by means of a pneumatic seal or other similar means that can adapt to the initial container and more particularly to the neck of a bottle.

The shape and dimensions of the receiving part and/or the through-duct are preferentially adapted to and complementary to those of the initial container in such a way as to ensure, once fitted into the receiving means 8, that it obstructs, in a substantially sealed manner, the passage between the inside of the enclosure 2 and the external environment 3.

The door 34 providing the interface 34 between the port and the external environment is optional. It corresponds to a temporary sealing means at each of the receiving means 8 making it possible to temporarily obstruct this passage in the absence of the initial container 9. This may for example be an articulated component, a seal or a flexible edge comb, or any other appropriate device that preferably automatically retracts when the initial container 9 is pushed.

In the examples shown, the initial containers 9 are bottles 12 containing a liquid 13 that can be sensitive to contact with air, namely wine. Of course, the invention can be applied to any type of initial container 9, such as, for example, bag-in-boxes, cubitainers, tanks, vats, casks, barrels, cans, flasks or the like.

The invention is particularly suited to wine sampling, regardless of the nature thereof: red, white, pink, sweet or sparkling, etc. However, it can also be applied to any other liquid 13 that is sensitive to contact with air and to other liquid foods, alcoholic or otherwise, such as whiskey, cognac, armagnac, vegetable oils (olive oil or other oils), etc.

In the embodiments shown, the receiving means 8 are intended to receive only the neck of the bottle 12, which penetrates within the through-duct and sinks until the shoulder of the bottle comes into contact with the receiving part, the body portion of the bottle remaining external thereto. The bottle 12 is then seated downwards, advantageously in an oblique position (usually 25 to 65° in relation to the horizontal), the end of the neck thereof emerging into the inlet port 6. It is thus perfectly positioned for the following steps of the method, and in particular the emptying thereof once opened.

The inlet port 6 comprises an opening station 14, which comprises an opening means 15 capable of opening an initial container 9 when it is fitted into a receiving means 8.

The nature of the opening means 15 depends upon the intended application and the classic closure manner of the initial containers 9 for this application. This can be for example, as shown, a corkscrew means or an unscrewing or perforation means.

The opening means 15 can be singular, as in the embodiment of FIG. 2. In the case where the device 1 comprises several receiving means 8 (FIG. 1), said single opening means 15 successively opens all of the initial containers 9 present within the receiving means 8.

The opening station 14 can also comprise several opening means 15 capable of simultaneously opening several initial containers 9, as in FIG. 1. The opening means 15 can be operated simultaneously by virtue of an actuator M.

A collection vessel 16 is also present within the enclosure 2 in order to collect the liquid flowing out of the initial containers 9, once opened by means of said opening means 15. For this purpose, the collection vessel 16 is preferably located underneath the opening station 14 present within the inlet port of the initial containers 6 or it can communicate therewith when the port is also placed under an inert atmosphere.

In the lower part of the collecting vessel 16, there is (are) one or more drainage ducts 17 emerging at a filling station 18 whereto the final containers 19 are placed or carried.

The final containers 19 preferably follow the following automatic cycle:
supply by means of a vibrating bowl container dispenser 10,
transfer of the containers on the conveyor 20,
conveyance with integrated placement,
purging the containers, advantageously using nitrogen, within a cleaning facility 23,
drying the containers within a drying facility 11,
filling with liquid,
removal of a stopper 22 such as a lid and then the fastening of the lid and container, notably by means of thermal bonding (in the case of a lid) or the screwing of a stopper (for a screw cap).

A system of valves, not shown and preferably automatic, can close or open the drainage ducts 17 in order to allow for the flowing through said drainage ducts 17 of the liquid from the collecting vessel 16, and can thus procure the filling of the final containers 19 located at the exit of said drainage ducts 17 within the filling station 18.

According to the variants, the device can comprise one or more drainage ducts 17. The various final containers 19 can either be filled consecutively within the filling station 18 or simultaneously.

According to a particular embodiment, filling level sensors, associated with valves and precision pumps, are used to accurately determine the necessary volume to be introduced into the containers. The latter will be filled either entirely or partially.

Any empty space within the container is filled with inert gas, in such a way as to create a non-reactive atmosphere for the liquid within the final container thereof. The liquid can thus be kept for several months within the pod thereof without any evolution of its organoleptic qualities.

The final containers 19 may be of any type and shape as long as they are suitable for the conservation of the liquid 13 to be sampled and have a capacity that is less than that of the initial container 9. These may be for example capsules, tubes, vials, pods, small bottles (miniature bottles or the like), flexible bags, cartons, or the like. They can be reusable or disposable, and are made from any suitable material, for example plastic, glass, aluminum or other metal, wood, cork, etc. Advantageously, they can be provided within a material that makes it possible to protect the liquid that they contain from light.

The sampling device 1 according to the invention is preferably automated without requiring human intervention within the enclosure 2. The final containers 19 can thus be automatically carried from one position to the other, for example by means of a conveyor 20, as shown.

The enclosure 2 also contains a hermetic sealing station 21 for the final containers 19 to which the latter are conducted once filled within the filling station 18. Within this station, the final containers 10 are sealed in an air-tight and hermetic manner in such a way as to guarantee that the liquid 13 that they contain remains sheltered from the air when the final containers have left the enclosure 2 under an inert atmosphere.

This hermetic sealing can be performed in various ways according to the nature and composition of the final containers. They can for example be directly sealed, welded or glued. A separate insert 22, such as for example a lid, a capsule or a cork, can also be attached and secured to the opening of said containers, including by means of welding, heat-sealing, gluing, sealing, seaming, screwing, wedging or the like. Where appropriate, the separate insert 22 can be introduced together with the final containers or by means of a port dedicated to the introduction of separate inserts 22.

Once hermetically sealed, the final containers are carried, preferably by means of the conveyor 20, to the outlet port 7, through which they are evacuated towards the outside of the enclosure 2.

The outlet port of the final containers 7 is preferentially positioned on the side or beneath the device. It advantageously comprises two doors, the first providing the inlet of the port (interface with the inert enclosure 2) and the second providing the outlet of the port (interface with the exterior). During the process, the first door is nominally open, and the second closed; the port is therefore filled with inert gas insofar as it in direct contact with the enclosure 2. For the extraction of filled containers, the filling of the port with ambient air is performed once a certain number of final filled containers have been introduced, in order to then allow for communication with the exterior.

The size of said port is advantageously reduced as much as possible in order to decrease the losses of quantities of inert gases during the purging of the port.

The structure of the device preferentially has means satisfying a practical and industrial logic:
chassis and frame made from a robust material (steel, sheet metal, etc.) dimensioned such as to respond to the forces of movement of the internal members and the pressure of the gas within the hermetically sealed enclosure,
one or more faces of a transparent material (polymethylmethacrylate, glass, etc.) in order to observe each stage of the automated process from the exterior, one or more doors, wherein the opening authorization can be slaved to the prior emptying of the inert gas (in order to prevent danger to humans), particularly in order to access the collection vessel, adjust the internal actuators, release certain mechanisms or containers.

FIG. 2 illustrates a particular embodiment of the inlet port 6 of an initial container 9. Said port comprises:

- a support 28 for maintaining an initial container 9 such as a bottle 12;
- a first receiving means 8 assuring the seal between the initial container and the port;
- an interface door 34 between the port and the external environment;
- an interface door 27 between the port and the enclosure 2;
- an opening means 15, for example a motorized corkscrew;
- a drainage hatch 32 for discharging the cleaning solution when the port 6 is cleaned;
- an evacuation hatch 33 for discharging at least one stopper of at least one initial container. When several initial containers are opened, several stoppers can be stored within the port 6 before being simultaneously evacuated;
- a tube 31 for supplying a cleaning solution making it possible to wash the port 6;
- optionally a tube 30 for supplying air;
- optionally an air outlet 25;
- a tube 26 supplying inert gas making it possible to place the port 6 under an inert atmosphere;
- an inert gas outlet 29.

The tube 26 and the outlet 29 can be connected to the control unit 5 (R) for the regulation of the atmosphere of the device 1.

Furthermore, the device 1 can comprise only one or a plurality of inlet ports 6 according to FIG. 2.

Obviously, the invention is not limited to the preferred embodiments described above and shown in the various figures, a person skilled in the art being able to make numerous modifications and imagine other embodiments without going beyond the framework and scope of the invention as defined by the claims.

The invention claimed is:

1. A sampling device of a liquid sensitive to contact with air, making it possible to decant said liquid, previously contained within an initial sealed container, into several final containers of a capacity that is less than that of the initial container, the device comprising:
    a plurality of inlet ports for at least one initial container, providing an interface between the exterior exposed to ambient air and the inlet of an enclosure, and each inlet port comprising at least one receiving station for connecting the initial container that communicates with the interior of the enclosure,
    wherein in the enclosure an inert atmosphere prevails, and the enclosure comprises:
    an opening station comprising an opening means of at least one initial container fitted into the at least one receiving station of the inlet port,
    a collection vessel, located beneath the opening station or communicating therewith in order to collect the liquid contained within the at least one initial container,
    a filling station for filling the final containers with liquid collected within the collection vessel,
    a sealing station for hermetically sealing the final containers; and
    an outlet port, providing an interface between the outlet of the enclosure and the exterior which is exposed to ambient air,
    wherein said sampling device allows the sampling of a liquid without any contact with air between the inlet port and the outlet port, from the opening of the initial container to the sealing of the final containers.

2. The device according to claim 1, wherein the inlet port comprises several receiving stations, and the opening station comprises several opening means provided in order to simultaneously open several initial containers.

3. The device according to claim 1 wherein the filling station comprises means that make it possible to fill several final containers simultaneously.

4. The device according to claim 1 wherein the receiving station of the inlet port is configured in such a way that the at least one initial container is partially fitted from the exterior until the part intended to be opened of said initial container emerges into the enclosure.

5. A method for sampling a liquid comprising the following steps:
    supplying a sampling device according to claim 1,
    supplying at least one sealed, initial container containing the liquid,
    supplying several empty final containers of a capacity that is less than that of the at least one initial container,
    and the following steps, all performed under an inert atmosphere:
    opening the at least one initial container,
    emptying the at least one initial container and collecting said liquid that is contained therein into a collection vessel,
    filling the final containers with a portion of said liquid provided by the collection vessel, and
    hermetically sealing the final containers filled with said liquid wherein the liquid does not contact air.

6. The method according to claim 5, wherein the several initial containers are supplied simultaneously.

7. The method according to claim 5 wherein the final containers are filled consecutively.

8. The method according to claim 5, wherein the several final containers are filled simultaneously.

9. The method according to claim 5 wherein the filled final containers are hermetically sealed, directly by means of welding or gluing, or by means of an independent insert.

10. A process comprising sampling wine or another liquid food or alcoholic beverage, with the sampling device of claim 1.

* * * * *